US010460309B2

(12) United States Patent
Yu et al.

(10) Patent No.: US 10,460,309 B2
(45) Date of Patent: Oct. 29, 2019

(54) PAYMENT VERIFICATION METHOD, APPARATUS AND SYSTEM

(71) Applicant: Alibaba Group Holding Limited, Grand Cayman (KY)

(72) Inventors: Yang Yu, Hangzhou (CN); Ke Wu, Hangzhou (CN)

(73) Assignee: Alibaba Group Holding Limited, Cayman Islands (KY)

( * ) Notice: Subject to any disclaimer, the term of this patent is extended or adjusted under 35 U.S.C. 154(b) by 641 days.

(21) Appl. No.: 14/863,077

(22) Filed: Sep. 23, 2015

(65) Prior Publication Data
US 2016/0086158 A1    Mar. 24, 2016

(30) Foreign Application Priority Data

Sep. 24, 2014   (CN) .......................... 2014 1 0495962

(51) Int. Cl.
*G06Q 20/40*     (2012.01)
*G06Q 20/32*     (2012.01)
(52) U.S. Cl.
CPC ....... *G06Q 20/3224* (2013.01); *G06Q 20/401* (2013.01); *G06Q 20/405* (2013.01)
(58) Field of Classification Search
CPC .. G06Q 20/401; G06Q 20/10; G06Q 20/4016; G06Q 20/3278; G06Q 20/382;
(Continued)

(56) References Cited

U.S. PATENT DOCUMENTS

2006/0143122 A1    6/2006  Sines et al.
2008/0167980 A1    7/2008  Aaron et al.
(Continued)

FOREIGN PATENT DOCUMENTS

CN    103503006 A    1/2008
CN    102034182 A    4/2011
(Continued)

OTHER PUBLICATIONS

PCT Search Report dated Dec. 22, 2015 for PCT application No. PCT/US15/51741, 10 pages.
(Continued)

*Primary Examiner* — Elda G Milef
(74) *Attorney, Agent, or Firm* — Lee & Hayes, P.C.

(57) ABSTRACT

Methods, apparatuses and systems of payment verification are disclosed. A method includes receiving a request for connecting to a receiver access point (AP) from a terminal of a payer to be verified and geographical location information of the receiver AP, verifying whether account information included in the request matches with pre-stored payment account information; returning a verification result to the receiver AP; receiving a payer terminal geographical location information verification request from a payment server if the verification result indicates a match; verifying geographical location information of the terminal of the payer to be verified based on the geographical location information of the receiver AP; and returning a verification result of the payer terminal geographical location information verification request to the payment server. The method increases the security of a payment process and prevents a legitimate user from suffering financial losses and unnecessary troubles.

20 Claims, 9 Drawing Sheets

(58) Field of Classification Search
CPC .. G06Q 20/4014; G06Q 20/102; G06Q 20/32; G06Q 20/40; G06Q 20/12; G06Q 20/18; G06Q 20/20; G06Q 20/4012; G06Q 30/0185; G06Q 20/00; G06Q 20/02; G06Q 20/105; G06Q 20/202; G06Q 20/206; G06Q 20/3224; G06Q 20/3674; G06Q 30/0267; G06Q 30/0269; G06Q 30/06; G06Q 10/0635; G06Q 20/08; G06Q 30/0238; G06Q 30/0613; G06Q 20/3821; G06Q 20/405; G06Q 20/409; G06Q 20/322; G06Q 20/425; G06Q 20/3266; G06Q 20/325; G06Q 20/3552; G06Q 10/08355; G06Q 30/0609
See application file for complete search history.

(56) References Cited

U.S. PATENT DOCUMENTS

| | | | |
|---|---|---|---|
| 2011/0022517 | A1 | 1/2011 | Hammad |
| 2011/0035318 | A1 | 2/2011 | Hargrove et al. |
| 2011/0137804 | A1* | 6/2011 | Peterson ............. G06Q 20/085 705/77 |
| 2012/0290468 | A1* | 11/2012 | Benco ................ G06Q 20/3224 705/39 |
| 2013/0275222 | A1 | 10/2013 | Amaro et al. |
| 2014/0114780 | A1 | 4/2014 | Menefee et al. |
| 2014/0304165 | A1* | 10/2014 | Salomon ................ H04W 4/00 705/44 |
| 2015/0302409 | A1* | 10/2015 | Malek ................ G06Q 20/3224 705/44 |

FOREIGN PATENT DOCUMENTS

| | | |
|---|---|---|
| CN | 102713953 A | 10/2012 |
| CN | 102855555 A | 1/2013 |
| CN | 103093344 A | 5/2013 |
| CN | 103874021 A | 6/2014 |

OTHER PUBLICATIONS

English-language translation of Second Office Action dated Aug. 28, 2018 by The State Intellectual Property Office of the People's Republic of China in corresponding Application No. 201410495962 (15 pages).

Second Office Action dated Aug. 28, 2018 by The State Intellectual Property Office of the People's Republic of China in corresponding Application No. 201410495962 (10 pages).

Third Office Action dated Dec. 27, 2018 by The State Intellectual Property Office of the People's Republic of China in corresponding Application No. 201410495962 (3 pages).

English-language translation of Third Office Action dated Dec. 27, 2018 by The State Intellectual Property Office of the People's Republic of China in corresponding Application No. 201410495962 (5 pages).

Notification of First Office Action issued by the State Intellectual Property Office of the People's Republic of China dated Dec. 18, 2017.

English-language translation of Notification of First Office Action issued by the State Intellectual Property Office of the People's Republic of China dated Dec. 18, 2017.

* cited by examiner

PAYMENT VERIFICATION METHOD, APPARATUS AND SYSTEM

CROSS REFERENCE TO RELATED PATENT APPLICATION

This application claims foreign priority to Chinese Patent Application No. 201410495962.9 filed on Sep. 24, 2014, entitled "Payment verification Method, Apparatus and System", which is hereby incorporated by reference in its entirety.

TECHNICAL FIELD

The present disclosure relates to the field of verifying identity information and geographical location information of a payer terminal, and particularly, to payment verification methods, apparatuses and systems.

BACKGROUND

With the development of the Internet, mobile payment has become a payment method that is widely adopted in the daily lives of people. Mobile payment is a new payment method that wirelessly completes a payment activity via a mobile device. A payer terminal used by the mobile payment may be a mobile phone, a personal digital assistant (PDA), a mobile personal computer (PC), etc. Being an easier and faster payment method, people usually select mobile payment to complete a payment after shopping, dining, and other types of consumptions. In order to facilitate user management and ensure user security, most payment platforms require a user to log in before making a payment. Specifically, an account name of the user and a corresponding password are input in a login screen that is displayed in a mobile phone or a mobile PC, and a payment operation is able to proceed only upon successful verification by a server.

However, the use of "account+password" only verification method to verify a payment process is still difficult to guarantee the security of a payment process. In an event that an account and a password are stolen and illegitimately used, an associated user will suffer inconvenience and even economic losses. In order to avoid these types of events, certain payment platforms bind an account and a password of a user with a mobile phone number of the user. On top of the "account+password" verification method, further payment verification is performed by sending a text message of validation code to a mobile phone number that has been bound in advance, thereby increasing the security of making a payment. However, in a real application process, this method still has serious security risks. Due to a serious issue of divulging text messages of validation codes in an existing network environment, an appropriator may achieve a text message transfer via fraudulent means or through a Trojan program in a mobile communication device to obtain a text message of validation code after stealing an account and a password of a user, even if the user has bound the account with a mobile phone number thereof. The appropriator may then masquerade an identity of the legitimate user to complete a payment operation.

Existing technologies are not able to sufficiently guarantee the security of a payment process and thus may bring financial losses and unnecessary troubles to legitimate users.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure. The present disclosure provides a method, an apparatus and a system of payment verification to address the problem of failing to sufficiently guarantee the security of a payment process in the existing technologies.

The present disclosure provides a payment verification method, which includes receiving a verification request for requesting to connect to a receiver access point (AP) from a terminal of a payer to be verified and geographical location information of the receiver AP, the verification request including account information of a payer to be verified; verifying the account information of the payer to be verified according to the verification request to determine whether the account information of the payer to be verified matches with pre-stored payment account information; returning a verification result of the verification request to the receiver AP; receiving a payer terminal geographical location information verification request from a payment server in response to the verification result of the verification request indicating a match; verifying geographical location information of the terminal of the payer to be verified based on the geographical location information of the receiver AP to determine whether the geographical location information of the receiver AP matches with pre-stored geographical location information of a registered receiver AP; and returning a verification result of the payer terminal geographical location information verification request to the payment server.

In an implementation, the method may further include receiving identification information of the terminal of the payer to be verified from the receiver AP; receiving a payer terminal identity information verification request from the payment server in response to the verification result of the verification request indicating a match; determining whether the identification information of the terminal of the payer to be verified matches with payer terminal identification information that has been bound with the pre-stored payment account information in advance; and returning a verification result of the payer terminal identity information verification request to the payment server.

In an implementation, the identification information of the terminal of the payer to be verified includes one or more of a network adapter Media Access Control (MAC) address of the terminal of the payer to be verified, a Bluetooth MAC address of the terminal of the payer to be verified, and an International Mobile Equipment Identity (IMEI) number of the terminal of the payer to be verified.

In an implementation, the account information of the payer to be verified may include a payment account to be verified and a password of the payment account to be verified.

In an implementation, prior to receiving the verification request for requesting to connect to the receiver AP from the terminal of the payer to be verified and the geographical location information of the receiver AP, the method may further include receiving and storing respective payment account information and respective payer terminal identification information that is sent from terminal(s) of payer(s); and establishing respective binding relationship(s) between the respective payment account information and the respective payer terminal identification information.

In an implementation, the respective payer terminal identification information may include one or more of respective network adapter MAC address(es) of the terminal(s) of the payer(s), respective Bluetooth MAC address(es) of the terminal(s) of the payer(s), and respective IMEI number(s) of the terminal(s) of the payer(s).

In an implementation, the respective payment account information may include a respective payment account and a password of the respective payment account.

In an implementation, prior to receiving the verification request for requesting to connect to the receiver AP from the terminal of the payer to be verified and the geographical location information of the receiver AP, the method may further include receiving and storing respective geographical location information of registered receiver AP(s).

In an implementation, the method may further include receiving receiver AP identification information from the receiver AP; determining whether the receiver AP identification information matches with pre-stored registered receiver AP identification information; sending a matching result of the receiver AP identification information to the payment server.

In an implementation, prior to receiving the verification request for requesting to connect to the receiver AP from the terminal of the payer to be verified and the geographical location information of the receiver AP, the method may further include receiving and storing identification information of the registered receiver AP; and establishing a corresponding relationship between the identification information of the registered receiver AP and pre-stored geographical location information of the registered receiver AP.

In an implementation, the identification information of the registered receiver AP may include a MAC address of the registered receiver AP.

In an implementation, prior to receiving the verification request for requesting to connect to the receiver AP from the terminal of the payer to be verified and the geographical location information of the receiver AP, the method may further include receiving and storing name information and other information of a receiving party to which the registered receiver AP belongs; and establishing a corresponding relationship between the identification information of the registered receiver AP and the name information and the other information of the receiving party to which the registered receiver AP belongs.

Correspondingly, the present disclosure further provides a payment verification apparatus, which includes a verification request receiving unit to receive a verification request for requesting to connect to a receiver access point (AP) from a terminal of a payer to be verified and geographical location information of the receiver AP, the verification request including account information of a payer to be verified; a verification request verifying unit to verify the account information of the payer to be verified according to the verification request to determine whether the account information of the payer to be verified matches with pre-stored payment account information; a verification result sending unit to return a verification result of the verification request to the receiver AP; a payer terminal geographical location information verification request receiving unit to receive a payer terminal geographical location information verification request from a payment server in response to the verification result of the verification request indicating a match; a payer terminal geographical location information verifying unit to verify geographical location information of the terminal of the payer to be verified based on the geographical location information of the receiver AP to determine whether the geographical location information of the receiver AP matches with pre-stored geographical location information of a registered receiver AP; and a payer terminal geographical location information verification result sending unit to return a verification result of the payer terminal geographical location information verification request to the payment server.

In an implementation, the apparatus may further include a to-be-verified payer terminal identification information receiving unit to receive identification information of the terminal of the payer to be verified from the receiver AP; a payer terminal identity information verification request receiving unit to receive a payer terminal identity information verification request from the payment server in response to the verification result of the verification request indicating a match; a payer terminal identity information verification request verifying unit to determine whether the identification information of the terminal of the payer to be verified matches with payer terminal identification information that has been bound with the pre-stored payment account information in advance; and a payer terminal identity information verification result sending unit to return a verification result of the payer terminal identity information verification request to the payment server.

In an implementation, the identification information of the terminal of the payer to be verified includes one or more of a network adapter MAC address of the terminal of the payer to be verified, a Bluetooth MAC address of the terminal of the payer to be verified, and an International Mobile Equipment Identity (IMEI) number of the terminal of the payer to be verified.

In an implementation, the account information of the payer to be verified may include a payment account to be verified and a password of the payment account to be verified.

In an implementation, prior to receiving the verification request for requesting to connect to the receiver AP from the terminal of the payer to be verified and the geographical location information of the receiver AP, the apparatus may further include a payer terminal information pre-storage unit to receive and store respective payment account information and respective payer terminal identification information that is sent from terminal(s) of payer(s); and a payer terminal information binding unit to establish respective binding relationship(s) between the respective payment account information and the respective payer terminal identification information.

In an implementation, the respective payer terminal identification information may include one or more of respective network adapter MAC address(es) of the terminal(s) of the payer(s), respective Bluetooth MAC address(es) of the terminal(s) of the payer(s), and respective IMEI number(s) of the terminal(s) of the payer(s).

In an implementation, the respective payment account information may include a respective payment account and a password of the respective payment account.

In an implementation, prior to receiving the verification request for requesting to connect to the receiver AP from the terminal of the payer to be verified and the geographical location information of the receiver AP, the apparatus may further include a geographical location information pre-storage unit to receive and store respective geographical location information of registered receiver AP(s).

In an implementation, the apparatus may further include a receiver AP identification information receiving unit to receive receiver AP identification information from the receiver AP; a receiver AP identification information verifying unit to determine whether the receiver AP identification information matches with pre-stored registered receiver AP identification information; and a receiver AP identification information verification result sending unit to send a matching result of the receiver AP identification information to the payment server.

In an implementation, prior to receiving the verification request for requesting to connect to the receiver AP from the terminal of the payer to be verified and the geographical location information of the receiver AP, the apparatus may further include a registered receiver AP identification information pre-storage unit to receive and store identification information of the registered receiver AP; and a registered receiver AP identification information matching unit to establish a corresponding relationship between the identification information of the registered receiver AP and pre-stored geographical location information of the registered receiver AP.

In an implementation, the identification information of the registered receiver AP may include a MAC address of the registered receiver AP.

In an implementation, prior to receiving the verification request for requesting to connect to the receiver AP from the terminal of the payer to be verified and the geographical location information of the receiver AP, the apparatus may further include a registered receiver AP relevant information receiving unit to receive and store name information and other information of a receiving party to which the registered receiver AP belongs; and a registered receiver AP relevant information matching unit to establish a corresponding relationship between the identification information of the registered receiver AP and the name information and the other information of the receiving party to which the registered receiver AP belongs.

The present disclosure provides a payment method, which includes sending a verification request to a receiver access point (AP) for requesting to connect to the receiver AP, the verification request including account information of a payer to be verified; receiving a verification result of the verification request that is sent by the receiver AP; sending a payment request to a payment server in response to the verification result of the verification request indicating a successful connection; and receiving a payment result of the payment request from the payment server.

Correspondingly, the present disclosure further provides a payment apparatus, which includes a verification request sending unit to send a verification request to a receiver access point (AP) for requesting to connect to the receiver AP, the verification request including account information of a payer to be verified; a verification request result receiving unit to receive a verification result of the verification request that is sent by the receiver AP; a payment request sending unit to send a payment request to a payment server in response to the verification result of the verification request indicating a successful connection; and a payment request result receiving unit to receive a payment result of the payment request from the payment server.

The present disclosure provides a payment settling method, which includes receiving a verification request for requesting a connection from a terminal of a payer to be verified, the verification request including account information of the payer to be verified; sending the verification request and geographical location information of a receiver access point (AP) to a server; receiving a verification result of the verification request from the server; and connecting to the terminal of the payer to be verified via a network and sending the verification result of the verification request to the terminal of the payer to be verified in response to the verification result of the verification request indicating a successful verification.

Correspondingly, the present disclosure further provides a payment settling apparatus, which includes a connection request verification request receiving unit to receive a verification request for requesting a connection from a terminal of a payer to be verified, the verification request including account information of the payer to be verified; a connection request verification request sending unit to send the verification request and geographical location information of a receiver AP to a server; a connection request verification result receiving unit to receive a verification result of the verification request from the server; and a connection request verification result sending unit to connect to the terminal of the payer to be verified via a network and send the verification result of the verification request to the terminal of the payer to be verified in response to the verification result of the verification request indicating a successful verification.

The present disclosure provides a method of implementing a payment, which includes receiving a payment request from a terminal of a payer to be verified; sending a payer terminal geographical location information verification request to a server; receiving a verification result of the payer terminal geographical location information verification request from the server; and sending a payment result of the payment request to the terminal of the payer to be verified.

Correspondingly, the present disclosure further provides a payment implementing apparatus, which includes a payment request receiving unit to receive a payment request from a terminal of a payer to be verified; a payer terminal geographical location information verification request sending unit to send a payer terminal geographical location information verification request to a server; a payer terminal geographical location information verification result receiving unit to receive a verification result of the payer terminal geographical location information verification request from the server; and a payment request result sending unit to send a payment result of the payment request to the terminal of the payer to be verified.

Correspondingly, the present disclosure further provides a payment verification system, which includes the payment verification apparatus, the payment apparatus, the payment settling apparatus and the payment implementing apparatus as described in the foregoing description.

As compared to the existing technologies, the present disclosure has the following advantages. A method, an apparatus and a system of payment verification that are provided by the present disclosure receive a verification request for requesting to connect to a receiver AP (i.e., wireless access point) from a terminal of a payer to be verified and geographical location information of the receiver AP, the verification request including account information of a payer to be verified; verify the account information of the payer to be verified according to the verification request to determine whether the account information of the payer to be verified matches with pre-stored payment account information; return a verification result of the verification request to the receiver AP; receive a payer terminal geographical location information verification request from a payment server in response to the verification result of the verification request indicating a match; verify geographical location information of the terminal of the payer to be verified based on the geographical location information of the receiver AP to determine whether the geographical location information of the receiver AP matches with pre-stored geographical location information of a registered receiver AP; and return a verification result of the payer terminal geographical location information verification request to the payment server. Therefore, the present disclosure achieves additional verification of geographical location information of a terminal of a payer on top of verification of an account and a password of the payer, such that a payment platform is able to ascertain that a payment operation performed on a certain account is an operation of a legitimate user, thereby enhancing the security of a payment process, and preventing the legitimate user from suffering financial losses and unnecessary troubles. Furthermore, positioning of illegitimate users can be achieved by verifying the geographical location information of the terminal of the payer, thereby facilitating to track on the illegitimate users.

DESCRIPTION OF THE DRAWINGS

In order to clearly describe technical solutions in the embodiments of the present disclosure or the existing technologies, accompanying drawings used for describing the embodiments or the existing technologies are described briefly herein. Apparently, the accompanying drawings merely represent a few embodiments described in the present disclosure, and one of ordinary skill in the art may still derive other drawings from these accompanying drawings without making any creative effort.

DETAILED DESCRIPTION

The present disclosure provides a payment verification method and an apparatus thereof, a payment method and an apparatus thereof, a payment settling method and an apparatus thereof, a payment implementing method and an apparatus thereof, and a payment verification system respectively. Exemplary embodiments are given as follows.

An AP which is described in all the following embodiments is an abbreviation for "Access Point", which is also referred to as a wireless access point, a session point, or an access bridge. The AP includes a pure wireless access point (a wireless AP), and/or includes a device such as a wireless router (which includes a wireless gateway, a wireless bridge, etc.).

A MAC which is described in all the following embodiments is an abbreviation for "Media Access Control", which is also referred to as media access control, and is an identifier for identifying a node of a LAN (local area network).

Figure 1:
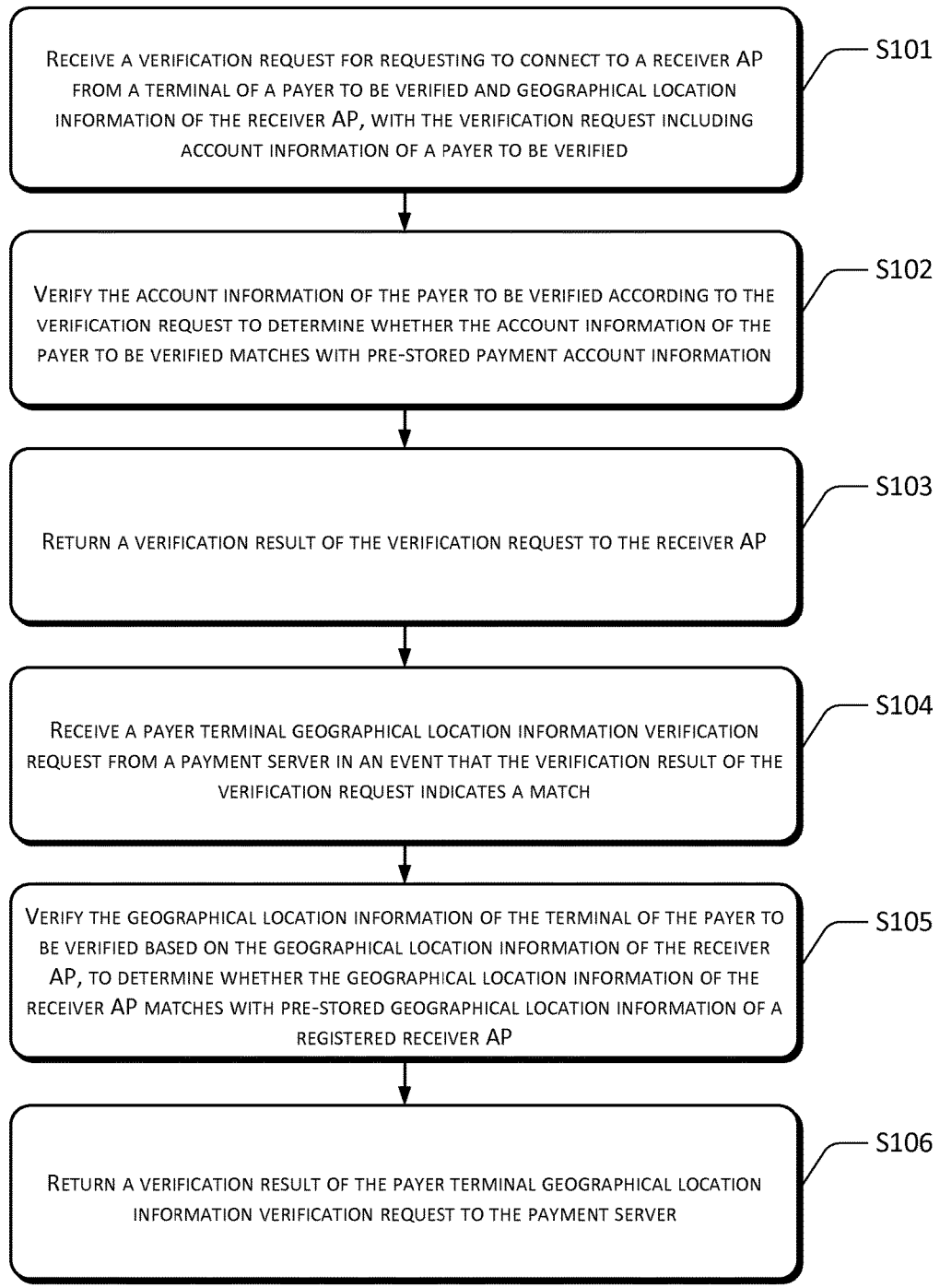
FIG. 1 is a flowchart of an example payment verification method according to the present disclosure.

FIG. 1 shows a flowchart of an example payment verification method according to the present disclosure. The method may include the following method blocks.

S101 receives a verification request for requesting to connect to a receiver AP from a terminal of a payer to be verified and geographical location information of the receiver AP, with the verification request including account information of a payer to be verified.

When a WiFi functional module of a terminal of a payer that is to be verified requests to connect to a receiver AP, the terminal of the payer to be verified may send a verification request for requesting to connect to a WiFi device of the receiver AP to the receiver AP. The verification request may include account information of the payer to be verified. The receiver AP sends the received verification request to a server, and the server receives the verification request, thereby, achieving sending the verification request by the WiFi functional module of the terminal of the payer to be verified when connecting to the receiver AP. As such, the server end is able to eventually obtain the account information of the payer to be verified, and the account information of the payer to be verified may be further verified at the server subsequently, thus achieving verification of the payment account of the payer via WiFi. Furthermore, a verification result of the account information of the payer to be verified may be taken as a result of the verification request for connecting to the WiFi, thereby reducing the number of operations for entering the account information in a payment process that is performed by the user through a connection to the Internet via WiFi, i.e., entering a WiFi password when connecting to WiFi, and entering a payment account and a password thereof when making a payment.

When sending the received verification request to the server, the receiver AP may treat the geographical location information of the receiver AP as geographical location information of the terminal of the payer to be verified, and further send the geographical location information to the server. As such, relevant information is provided to the server for verification of the geographical location information of the terminal of the payer in a subsequent procedure, thereby achieving the verification of the geographical location information of the terminal of the payer via WiFi.

S102 verifies the account information of the payer to be verified according to the verification request to determine whether the account information of the payer to be verified matches with pre-stored payment account information.

The server may compare payment account information that is pre-stored in a database with the received account information of the payer to be verified. If the account information to be verified that is entered by the payer corresponds to account information that has been registered and applied for in a payment platform, the server is able to find the pre-stored payment account information that matches with the account information of the payer to be verified from the database, and a determination result indicates a match. If the payment account information to be verified that is entered by the payer does not correspond to the account information that has been registered and applied for in the payment platform, the server is not able to find any pre-stored payment account information that matches with the account information of the payer to be verified in the database, and a determination result thereof indicates a mismatch. This method block may realize verification of the payment account information to be verified that is entered by the payer and guarantee the security of accounts of legitimate users, thereby guaranteeing the security of a payment process and preventing the legitimate users from suffering financial losses and unnecessary troubles.

S103 returns a verification result of the verification request to the receiver AP.

A result of matching between the account information of the payer to be verified and the pre-stored payment account information is sent to the receiver AP as a verification result of the verification request. The receiver AP performs a corresponding operation according to the received verification result of the verification request. In other words, if the verification result of the verification request indicates a match between the account information of the payer to be verified matches and the pre-stored payment account information, a determination may be made that the account information of the payer to be verified is authentic payment account information. The receiver AP may allow the terminal of the payer to be verified to connect the receiver AP via WiFi, and the receiver AP may send a message of successful connection to the terminal of the payer to be verified as the verification result of the verification request of the terminal of the payer to be verified for requesting to connect to the receiver AP, in order to allow the payer to perform a subsequent payment operation. Otherwise, a determination may be made that the account information of the payer to be verified is fake payment account information. The terminal of the payer to be verified is not allowed to connect the receiver AP, and the receiver AP may send a message of failed connection to the terminal of the payer to be verified as the verification result of the verification request of the terminal of the payer to be verified for requesting to connect to the receiver AP, to terminate a payment operation. This therefore prevents illegitimate users to perform a payment operation, guarantees the security of accounts of legitimate users, and enhances the security of a payment process.

S104 receives a payer terminal geographical location information verification request from a payment server in an event that the verification result of the verification request indicates a match.

If the verification result of the verification request indicates that the account information of the payer to be verified matches with the pre-stored payment account information, the receiver AP allows the terminal of the payer to be verified to connect the receiver AP via WiFi, and the terminal of the payer to be verified may send a payment request to a payment server through a network. In order to increase the security of the payment process, the payment server may send a payer terminal geographical location information verification request to the server for requesting the server to verify the geographical location information of the terminal of the payer after receiving the payment request. The payment server may wait to perform a relevant payment operation after receiving a verification result of the geographical location information of the terminal of the payer. The server receives the payer terminal geographical location information verification request sent by the payment server, to timely initiate an operation of verification of the geographical location information of the terminal of the payer that is sent from the payment server.

S105 verifies the geographical location information of the terminal of the payer to be verified based on the geographical location information of the receiver AP, to determine whether the geographical location information of the receiver AP matches with pre-stored geographical location information of a registered receiver AP.

In the foregoing method block, when the receiver AP sends the verification request of the terminal of the payer to be verified that is received from the terminal of the payer to be verified for requesting to connect the receiver AP to the server, the receiver AP takes the geographical location information of the receiver AP as the geographical location information of the terminal of the payer to be verified, which is further sent to the server. As such, verification of the geographical location information of the terminal of the payer to be verified may be performed based on the received geographical location information of the receiver AP, to determine whether the geographical location information of the receiver AP matches with pre-stored geographical location information of a registered receiver AP.

When determining whether the geographical location information of the receiver AP matches with pre-stored geographical location information of a registered receiver AP, the server compares respective geographical location information of registered receiver AP(s) that is/are pre-stored in a database with the geographical location information of the receiver AP that is received when making a payment, thereby determining whether the payer is located at a payment site that is authorized by a payment platform. If the payer is located at a payment site authorized by a payment platform, a determination result indicates a match. Otherwise, the determination result indicates a mismatch. This realizes a determination of whether a payer terminal is located at a payment site authorized by a payment platform in a payment process, i.e., realizes verification of geographical location information of the payer terminal, such that the payment platform is able to confirm whether a payment operation performed with a certain account is an operation of a legitimate user. Therefore, the security of the payment process is increased, and legitimate users are prevented from suffering financial losses and unnecessary troubles. Furthermore, positioning of illegitimate users is achieved through the verification of the geographical location information of the payer terminal, thus facilitating to track on the illegitimate users.

S106 returns a verification result of the payer terminal geographical location information verification request to the payment server.

After verifying the geographical location information of the terminal of the payer, the server sends a verification result of the geographical location information of the terminal of the payer to the payment server, to facilitate the payment server to perform relevant operations. Specifically, if the verification result of the geographical location information of the terminal of the payer indicates a match, the payment server is able to confirm that a payment operation performed with the payment account to be verified is an operation of a legitimate user. The payment server then performs a relevant payment operation, and sends a message of successful payment to the terminal of the payer to be verified as a payment result. Otherwise, the payment server is able to confirm that the payment operation performed with the payment account to be verified is an operation of an illegitimate user, thus refusing to perform a relevant payment operation and sending a message of payment failure to the terminal of the payer to be verified as the payment result. This thereby realizes an addition of verification of the geographical location information of the terminal of the payer on a basis of verification that is performed on an account and a password of the payer through WiFi, such that the payment platform is able to confirm whether a payment operation performed with a certain account is an operation of a legitimate user. Therefore, the security of the payment process is increased, and legitimate users are prevented from suffering financial losses and unnecessary troubles. Furthermore, positioning of illegitimate users is achieved through the verification of the geographical location information of the payer terminal, thus facilitating to track on the illegitimate users.

In an implementation, the method may further include receiving identification information of the terminal of the payer to be verified from the receiver AP; receiving a payer terminal identity information verification request from the payment server in response to the verification result of the verification request indicating a match; determining whether the identification information of the terminal of the payer to be verified matches with payer terminal identification information that has been bound with the pre-stored payment account information in advance; and returning a verification result of the payer terminal identity information verification request to the payment server. In order to further increase the security of the payment process, the payment server may send a payer terminal identity information verification request to the server to request the server to verify identity information of the terminal of the payer after the payment server receives the payment request.

The server may search for payer terminal identification information that has been bound with the payment account information in advance based on the payment account information that is to be verified and has successfully passed verification, i.e., searches for pre-bound payer terminal identification information based on pre-stored payment account information. Upon finding the payer terminal identification information that has been pre-bound with the pre-stored payment account information, a determination is made as to whether identification information of the terminal of the payer to be verified matches with the payer terminal identification information that is pre-bound with the pre-stored payment account information. Identification information of terminals is able to uniquely identify each terminal device. Under the circumstance that a legitimate user has bound account information with identification information of a terminal device thereof in advance, the server may compare the identification information of the terminal of the payer to be verified that is received when a payment is made with the pre-bound payer terminal identification information of an account of the legitimate user, to determine whether the terminal of the payer is a terminal device that is bound with the account of the legitimate user. If the terminal of the payer to be verified is a terminal device bound with the account of the legitimate user, identification information of the terminal of the payer to be verified matches with the payer terminal identification information that is pre-bound with the pre-stored payment account information. Otherwise, a determination result indicates a mismatch. As such, determining whether the payer terminal is a device possessed by an account owner during the payment process is achieved, i.e., verification of the identity information of the terminal of the payer is achieved. As such, the payment platform is able to further confirm whether a payment operation performed with a certain account is an operation of a legitimate user, thereby increasing the security of the payment process, and preventing legitimate users from suffering financial losses and unnecessary troubles.

In an implementation, the identification information of the terminal of the payer to be verified includes one or more of a network adapter Media Access Control (MAC) address of the terminal of the payer to be verified, a Bluetooth MAC address of the terminal of the payer to be verified, and an International Mobile Equipment Identity (IMEI) number of the terminal of the payer to be verified. These pieces of information are able to uniquely identify each terminal device, and the server may verify the identification information of the terminal of the payer, to identify whether the terminal of the payer to be verified is the device possessed by the account owner.

In an implementation, the account information of the payer to be verified may include a payment account to be verified and a password of the payment account to be verified.

In an implementation, prior to receiving the verification request for requesting to connect to the receiver AP from the terminal of the payer to be verified and the geographical location information of the receiver AP, the method may further include receiving and storing respective payment account information and respective payer terminal identification information that is sent from terminal(s) of payer(s); and establishing respective binding relationship(s) between the respective payment account information and the respective payer terminal identification information. A legitimate user needs to send account information and terminal device identification information thereof through a terminal device thereof to a server in advance. The server binds the account information with the terminal device identification information of the legitimate user, to facilitate identification of a payer terminal in future payment.

In an implementation, the respective payer terminal identification information may include one or more of respective network adapter MAC address(es) of the terminal(s) of the payer(s), respective Bluetooth MAC address(es) of the terminal(s) of the payer(s), and respective IMEI number(s) of the terminal(s) of the payer(s).

In an implementation, the respective payment account information may include a respective payment account and a password of the respective payment account.

In an implementation, prior to receiving the verification request for requesting to connect to the receiver AP from the terminal of the payer to be verified and the geographical location information of the receiver AP, the method may further include receiving and storing respective geographical location information of registered receiver AP(s). The server needs to store respective geographical location information of registered receiver AP(s) in advance, to facilitate verification of a payment site where a payer terminal is located when a payment is made.

In an implementation, the method may further include receiving receiver AP identification information from the receiver AP; determining whether the receiver AP identification information matches with pre-stored registered receiver AP identification information; sending a matching result of the receiver AP identification information to the payment server. In order to further increase the security of the payment process, verification of an identity of the receiver AP may be added. In the payment process, after receiving the verification request of the terminal of the payer to be verified for requesting a connection with the receiver AP, the server may obtain identification information of the receiver AP from the receiver AP, and determine whether the identification information of the receiver AP matches with pre-stored identification information of a registered receiver AP at a subsequent stage. If a match is found, a determination is able to make that the receiver AP is an AP authenticated by a payment platform, thereby further increasing the security of the payment process and preventing legitimate users from suffering financial losses and unnecessary troubles. If no match is found, a determination is able to make that the receiver AP is not an AP authenticated by the payment platform, and a risk may exist in the payment process.

In an implementation, prior to receiving the verification request for requesting to connect to the receiver AP from the terminal of the payer to be verified and the geographical location information of the receiver AP, the method may further include receiving and storing identification information of a registered receiver AP; and establishing a corresponding relationship between the identification information of the registered receiver AP and pre-stored geographical location information of the registered receiver AP. The server may pre-store respective identification information of AP(s) that is/are authenticated by the payment platform. The payment platform may arrange the AP(s) authenticated by the payment platform at receiver(s) authenticated by the payment platform. The server may establish a corresponding relationship between respective identification information of registered receiver AP(s) and pre-stored geographical location information of the registered receiver AP(s), so as to get aware of location information of a respective registered receiver to which a registered receiver AP belongs, thereby facilitating verification of the receiver AP when making a payment.

In an implementation, the identification information of the registered receiver AP may include a MAC address of the registered receiver AP. MAC addresses of APs are able to uniquely identify each AP. By verifying a MAC address of the receiver AP, the server may determine whether the receiver AP is an AP authenticated by the payment platform, thereby increasing the security of the payment process.

In an implementation, prior to receiving the verification request for requesting to connect to the receiver AP from the terminal of the payer to be verified and the geographical location information of the receiver AP, the method may further include receiving and storing name information and other information of a receiving party to which the registered receiver AP belongs; and establishing a corresponding relationship between the identification information of the registered receiver AP and the name information and the other information of the receiving party to which the registered receiver AP belongs. The server may further pre-store other information such as a name of a receiving party or receiver authenticated by the payment platform, such that the payment platform is further able to get aware of payment information in more details to facilitate management and ensure the security of legitimate users.

In an implementation, the terminal of the payer to be verified may include a mobile terminal device, and may be a mobile phone owned by the payer. The receiving party or receiver may include a merchant store, and the registered receiver AP may include a wireless router that is verified by the payment platform and is deployed the merchant store.

Figure 2:
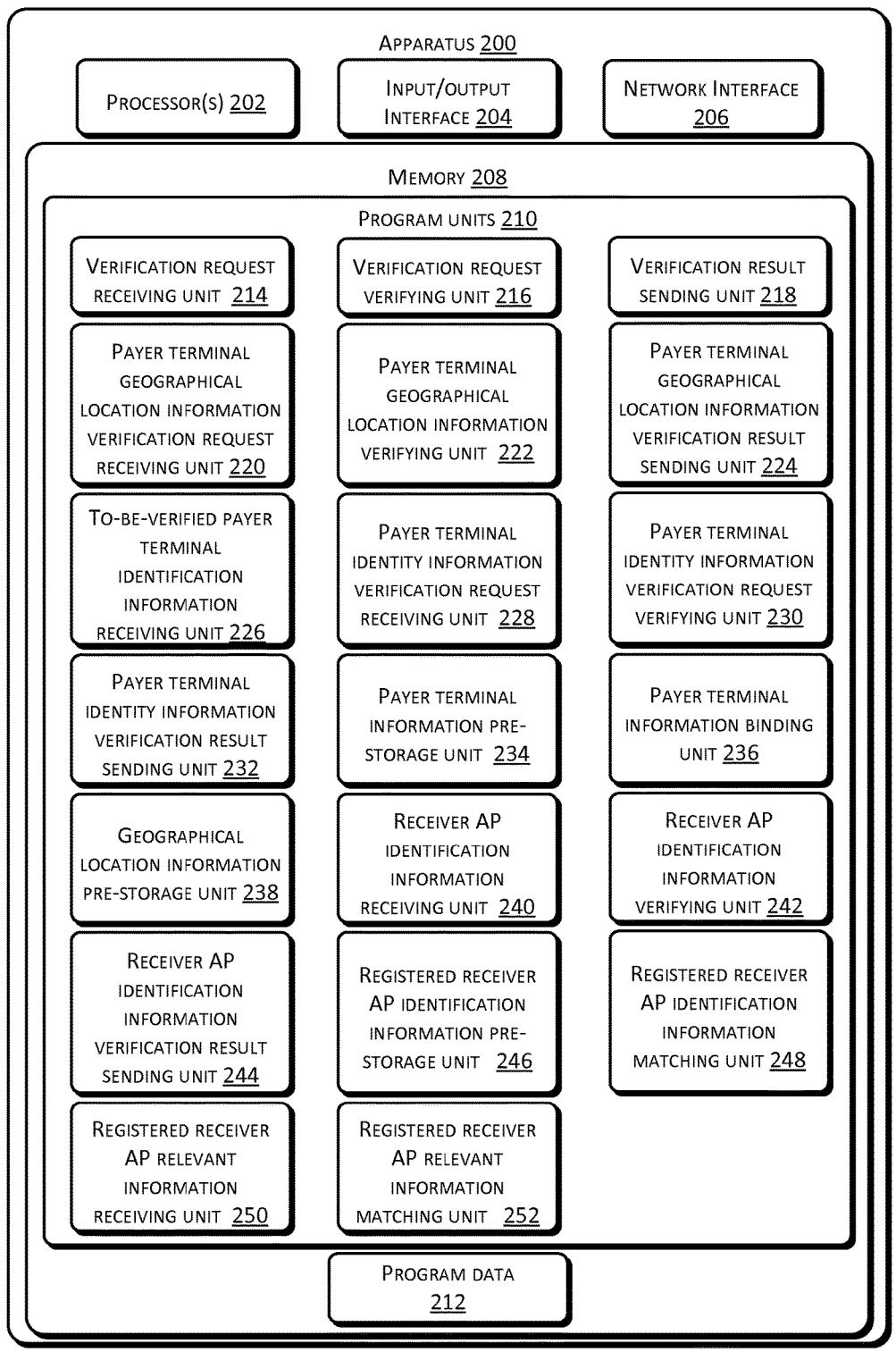
FIG. 2 is a schematic diagram of an example payment verification apparatus according to the present disclosure.

The foregoing embodiments provide a payment verification method. Corresponding thereto, the present disclosure further provides a payment verification apparatus. FIG. 2 shows a schematic diagram of an example payment verification apparatus 200 according to the present disclosure. Since the apparatus embodiment is substantially similar to the method embodiment, a description thereof is relatively simple, and a related portion may be found by referring to the relevant description of the method embodiment. The apparatus embodiment described herein is used for illustrative purpose only.

In an implementation, the example payment verification apparatus 200 may include one or more processors 202, an input/output (I/O) interface 204, a network interface 206 and memory 208.

The memory 208 may include a form of computer readable media such as volatile memory, Random Access Memory (RAM), and/or non-volatile memory, e.g., Read-Only Memory (ROM) or flash RAM, etc. The memory 208 is an example of a computer readable media.

The computer readable media may include a permanent or non-permanent type, a removable or non-removable media, which may achieve storage of information using any method or technology. The information may include a computer-readable command, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In an implementation, the memory 208 may include program units 210 and program data 212. The program units 210 may include a verification request receiving unit 214 to receive a verification request for requesting to connect to a receiver access point (AP) from a terminal of a payer to be verified and geographical location information of the receiver AP, the verification request including account information of a payer to be verified; a verification request verifying unit 216 to verify the account information of the payer to be verified according to the verification request to determine whether the account information of the payer to be verified matches with pre-stored payment account information; a verification result sending unit 218 to return a verification result of the verification request to the receiver AP; a payer terminal geographical location information verification request receiving unit 220 to receive a payer terminal geographical location information verification request from a payment server in response to the verification result of the verification request indicating a match; a payer terminal geographical location information verifying unit 222 to verify geographical location information of the terminal of the payer to be verified based on the geographical location information of the receiver AP to determine whether the geographical location information of the receiver AP matches with pre-stored geographical location information of a registered receiver AP; and a payer terminal geographical location information verification result sending unit 224 to return a verification result of the payer terminal geographical location information verification request to the payment server.

In an implementation, the apparatus 200 may further include a to-be-verified payer terminal identification information receiving unit 226 to receive identification information of the terminal of the payer to be verified from the receiver AP; a payer terminal identity information verification request receiving unit 228 to receive a payer terminal identity information verification request from the payment server in response to the verification result of the verification request indicating a match; a payer terminal identity information verification request verifying unit 230 to determine whether the identification information of the terminal of the payer to be verified matches with payer terminal identification information that has been bound with the pre-stored payment account information in advance; and a payer terminal identity information verification result sending unit 232 to return a verification result of the payer terminal identity information verification request to the payment server.

In an implementation, the identification information of the terminal of the payer to be verified includes one or more of a network adapter MAC address of the terminal of the payer to be verified, a Bluetooth MAC address of the terminal of the payer to be verified, and an International Mobile Equipment Identity (IMEI) number of the terminal of the payer to be verified.

In an implementation, the account information of the payer to be verified may include a payment account to be verified and a password of the payment account to be verified.

In an implementation, prior to receiving the verification request for requesting to connect to the receiver AP from the terminal of the payer to be verified and the geographical location information of the receiver AP, the apparatus 200 may further include a payer terminal information pre-storage unit 234 to receive and store respective payment account information and respective payer terminal identification information that is sent from terminal(s) of payer(s); and a payer terminal information binding unit 236 to establish respective binding relationship(s) between the respective payment account information and the respective payer terminal identification information.

In an implementation, the respective payer terminal identification information may include one or more of respective network adapter MAC address(es) of the terminal(s) of the payer(s), respective Bluetooth MAC address(es) of the terminal(s) of the payer(s), and respective IMEI number(s) of the terminal(s) of the payer(s).

In an implementation, the respective payment account information may include a respective payment account and a password of the respective payment account.

In an implementation, prior to receiving the verification request for requesting to connect to the receiver AP from the terminal of the payer to be verified and the geographical location information of the receiver AP, the apparatus 200 may further include a geographical location information pre-storage unit 238 to receive and store respective geographical location information of registered receiver AP(s).

In an implementation, the apparatus 200 may further include a receiver AP identification information receiving unit 240 to receive receiver AP identification information from the receiver AP; a receiver AP identification information verifying unit 242 to determine whether the receiver AP identification information matches with pre-stored registered receiver AP identification information; and a receiver AP identification information verification result sending unit 244 to send a matching result of the receiver AP identification information to the payment server.

In an implementation, prior to receiving the verification request for requesting to connect to the receiver AP from the terminal of the payer to be verified and the geographical location information of the receiver AP, the apparatus 200 may further include a registered receiver AP identification information pre-storage unit 246 to receive and store identification information of a registered receiver AP; and a registered receiver AP identification information matching unit 248 to establish a corresponding relationship between the identification information of the registered receiver AP and pre-stored geographical location information of the registered receiver AP.

In an implementation, the identification information of the registered receiver AP may include a MAC address of the registered receiver AP.

In an implementation, prior to receiving the verification request for requesting to connect to the receiver AP from the terminal of the payer to be verified and the geographical location information of the receiver AP, the apparatus 200 may further include a registered receiver AP relevant information receiving unit 250 to receive and store name information and other information of a receiving party to which the registered receiver AP belongs; and a registered receiver AP relevant information matching unit 252 to establish a corresponding relationship between the identification information of the registered receiver AP and the name information and the other information of the receiving party to which the registered receiver AP belongs.

Figure 3:
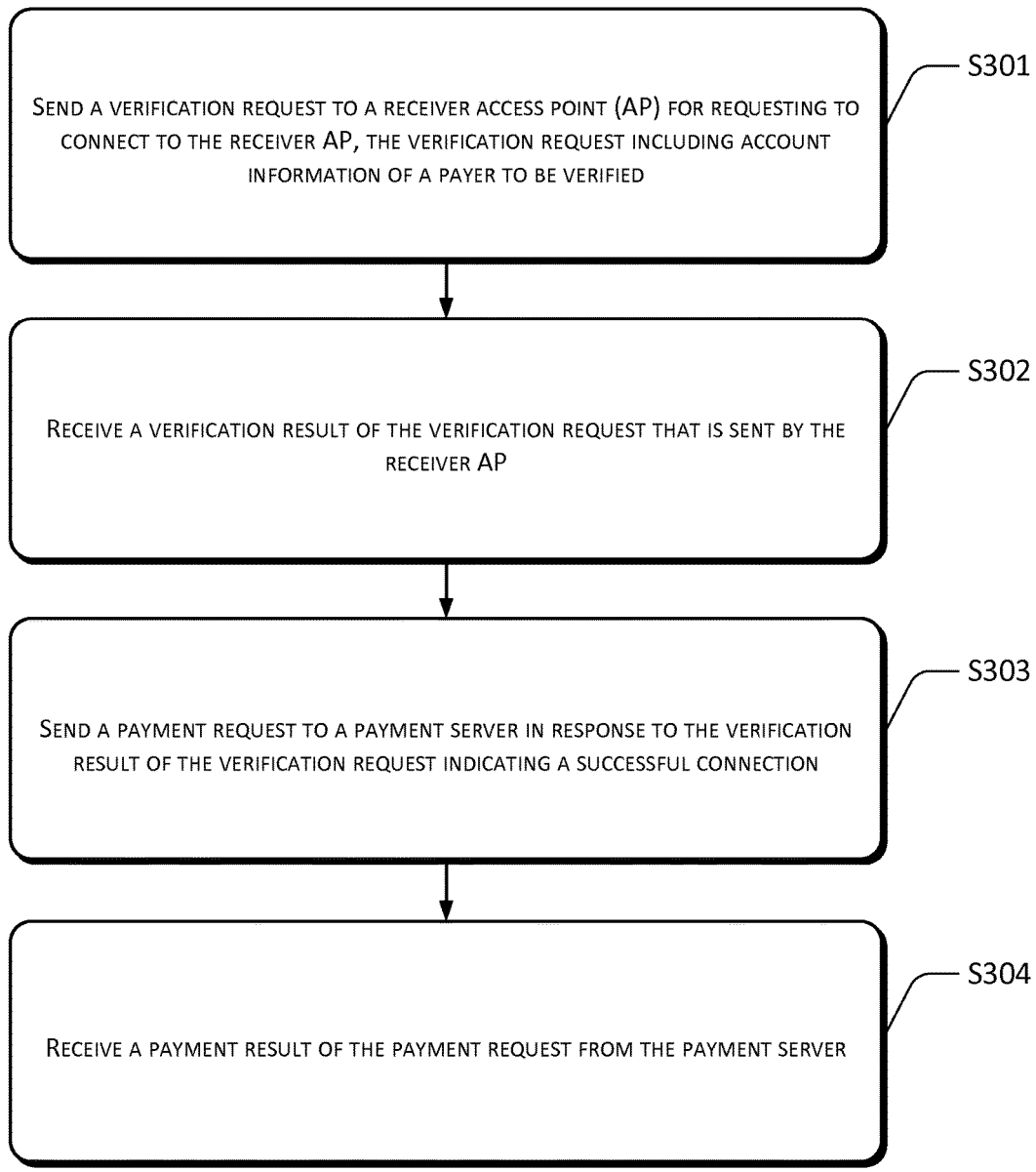
FIG. 3 is a flowchart of an example payment method according to the present disclosure.

In correspondence with the foregoing payment verification method, the present disclosure further provides a payment method as shown in FIG. 3. The portion of this embodiment which is the same as the content of the example payment verification method is not repeatedly described herein, and may be referenced to a corresponding portion in the example the payment verification method. In an implementation, a payment method provided by the present disclosure may include sending a verification request to a receiver access point (AP) for requesting to connect to the receiver AP at S301, the verification request including account information of a payer to be verified; receiving a verification result of the verification request that is sent by the receiver AP at S302; sending a payment request to a payment server in response to the verification result of the verification request indicating a successful connection at S303; and receiving a payment result of the payment request from the payment server at S304.

Figure 4:
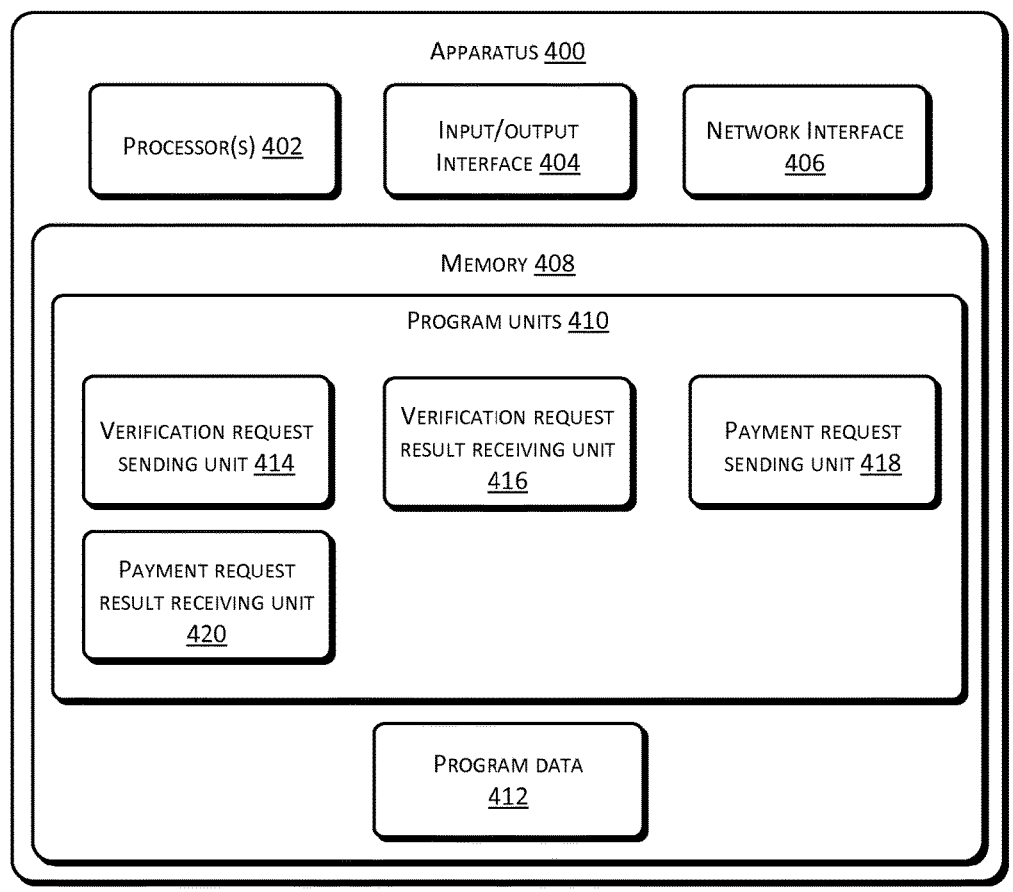
FIG. 4 is a schematic diagram of an example payment apparatus according to the present disclosure.

The above embodiment provides a payment method. Correspondingly, the present disclosure further provides a payment apparatus 400 as shown in FIG. 4. Since the apparatus embodiment is substantially similar to the method embodiment, a description thereof is relatively simple, and a related portion can be found by referring to the description of the portion of the method embodiment. The apparatus embodiment described herein is used for illustrative purpose only.

In an implementation, the payment apparatus 400 may include one or more processors 402, an input/output (I/O) interface 404, a network interface 406 and memory 408.

The memory 408 may include a form of computer readable media such as volatile memory, Random Access Memory (RAM), and/or non-volatile memory, e.g., Read-Only Memory (ROM) or flash RAM, etc. The memory 408 is an example of a computer readable media as described in the foregoing embodiments.

In an implementation, the memory 408 may include program units 410 and program data 412. The program units 410 may include a verification request sending unit 414 to send a verification request to a receiver access point (AP) for requesting to connect to the receiver AP, the verification request including account information of a payer to be verified; a verification request result receiving unit 416 to receive a verification result of the verification request that is sent by the receiver AP; a payment request sending unit 418 to send a payment request to a payment server in response to the verification result of the verification request indicating a successful connection; and a payment request result receiving unit 420 to receive a payment result of the payment request from the payment server.

Figure 5:
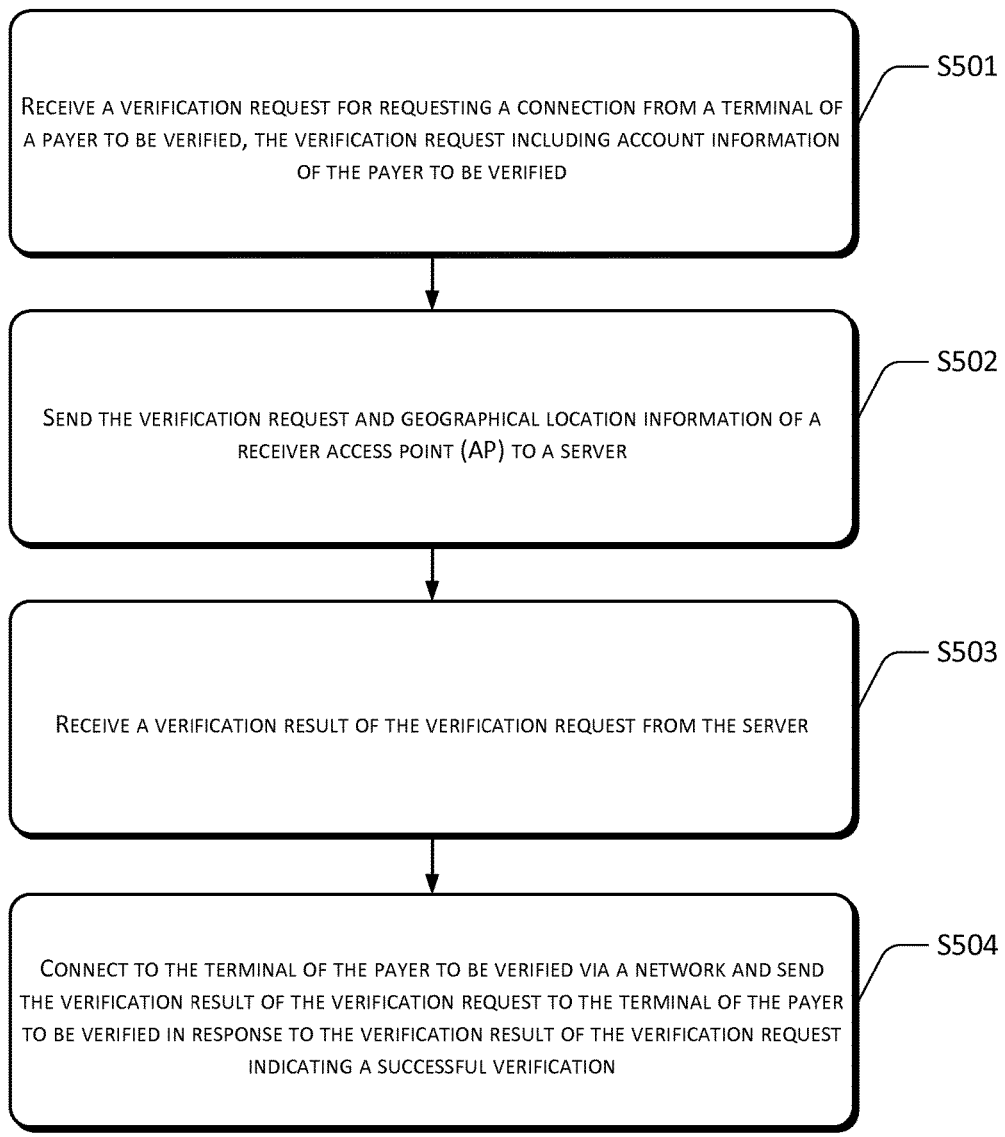
FIG. 5 is a flowchart of an example payment settling method according to the present disclosure.

Corresponding to the foregoing payment verification method, the present disclosure further provides a payment settling method as shown in FIG. 5. The portion of this embodiment which is the same as the content of the example payment verification method is not repeatedly described herein, and may be referenced to a corresponding portion in the example the payment verification method.

In an implementation, a payment settling method provided by the present disclosure may include receiving a verification request for requesting a connection from a terminal of a payer to be verified at S501, the verification request including account information of the payer to be verified; sending the verification request and geographical location information of a receiver access point (AP) to a server at S502; receiving a verification result of the verification request from the server at S503; and connecting to the terminal of the payer to be verified via a network and sending the verification result of the verification request to the terminal of the payer to be verified in response to the verification result of the verification request indicating a successful verification S504.

Figure 6:
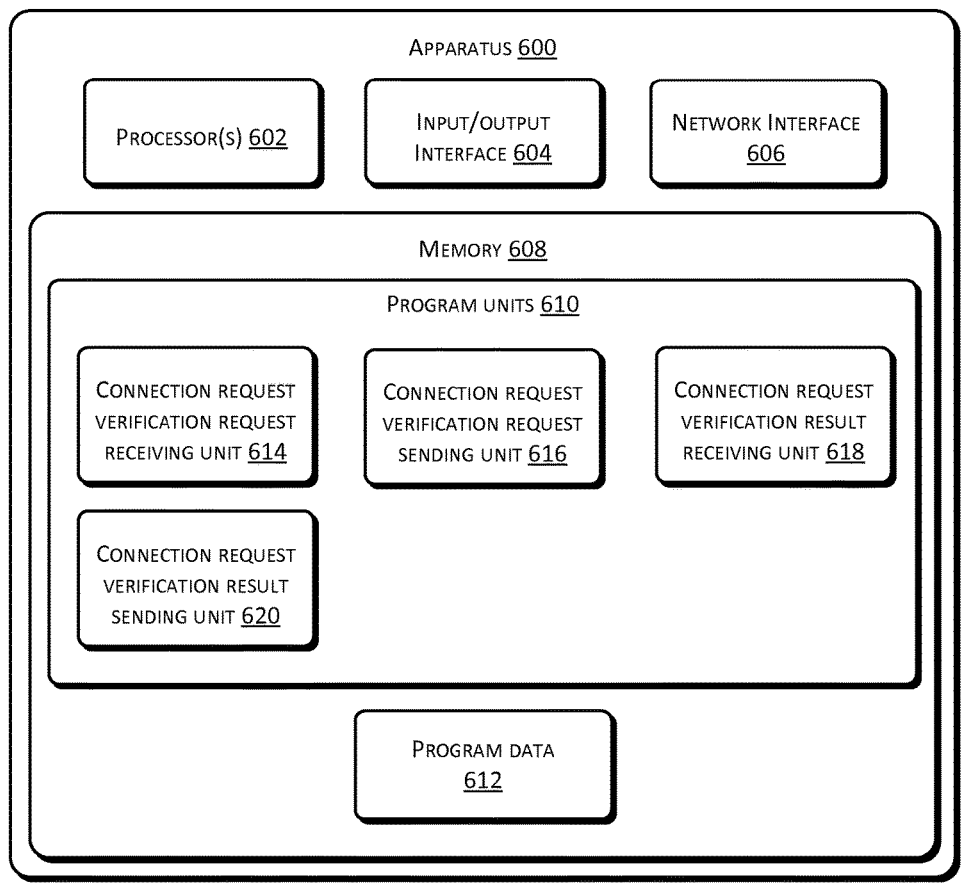
FIG. 6 is a schematic diagram of an example payment settling apparatus according to the present disclosure.

The above embodiment provides a payment settling method. Correspondingly, the present disclosure further provides a payment settling apparatus 600 as shown in FIG. 6. Since the apparatus embodiment is substantially similar to the method embodiment, a description thereof is relatively simple, and a related portion can be found by referring to the description of the portion of the method embodiment. The apparatus embodiment described herein is used for illustrative purpose only.

In an implementation, the payment settling apparatus 600 may include one or more processors 602, an input/output (I/O) interface 604, a network interface 606 and memory 608.

The memory 608 may include a form of computer readable media such as volatile memory, Random Access Memory (RAM), and/or non-volatile memory, e.g., Read-Only Memory (ROM) or flash RAM, etc. The memory 608 is an example of a computer readable media as described in the foregoing embodiments.

In an implementation, the memory 608 may include program units 610 and program data 612. The program units 610 may include a connection request verification request receiving unit 614 to receive a verification request for requesting a connection from a terminal of a payer to be verified, the verification request including account information of the payer to be verified; a connection request verification request sending unit 616 to send the verification request and geographical location information of a receiver AP to a server; a connection request verification result receiving unit 618 to receive a verification result of the verification request from the server; and a connection request verification result sending unit 620 to connect to the terminal of the payer to be verified via a network and send the verification result of the verification request to the terminal of the payer to be verified in response to the verification result of the verification request indicating a successful verification.

Figure 7:
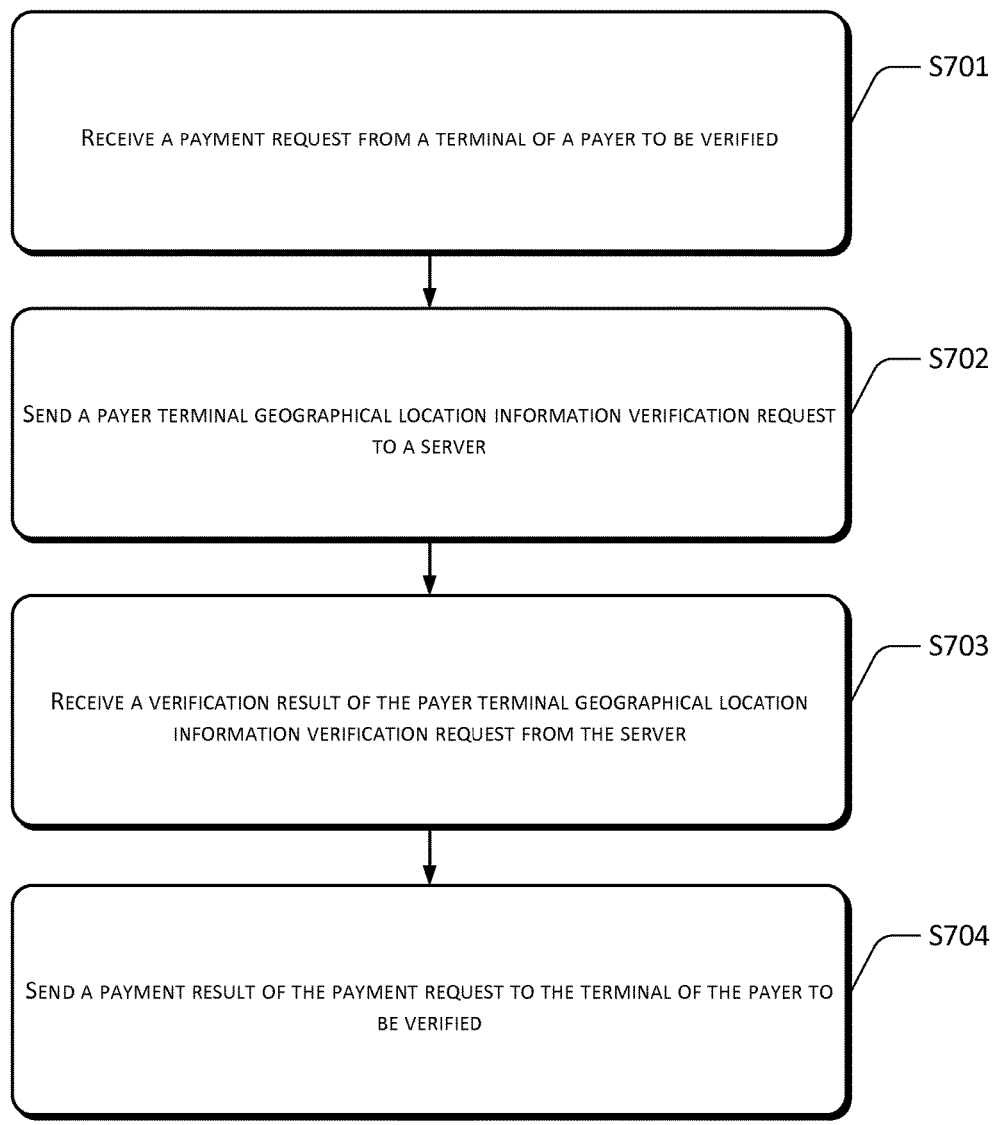
FIG. 7 is a flowchart of an example payment implementing method according to the present disclosure.

Corresponding to the foregoing payment verification method as the above, the present disclosure further provides a payment implementing method as shown in FIG. 7. The portion of this embodiment which is the same as the content of the example payment verification method is not repeatedly described herein, and may be referenced to a corresponding portion in the example the payment verification method.

In an implementation, the payment implementing method may include receiving a payment request from a terminal of a payer to be verified at S701; sending a payer terminal geographical location information verification request to a server at S702; receiving a verification result of the payer terminal geographical location information verification request from the server at S703; and sending a payment result of the payment request to the terminal of the payer to be verified at S704.

Figure 8:
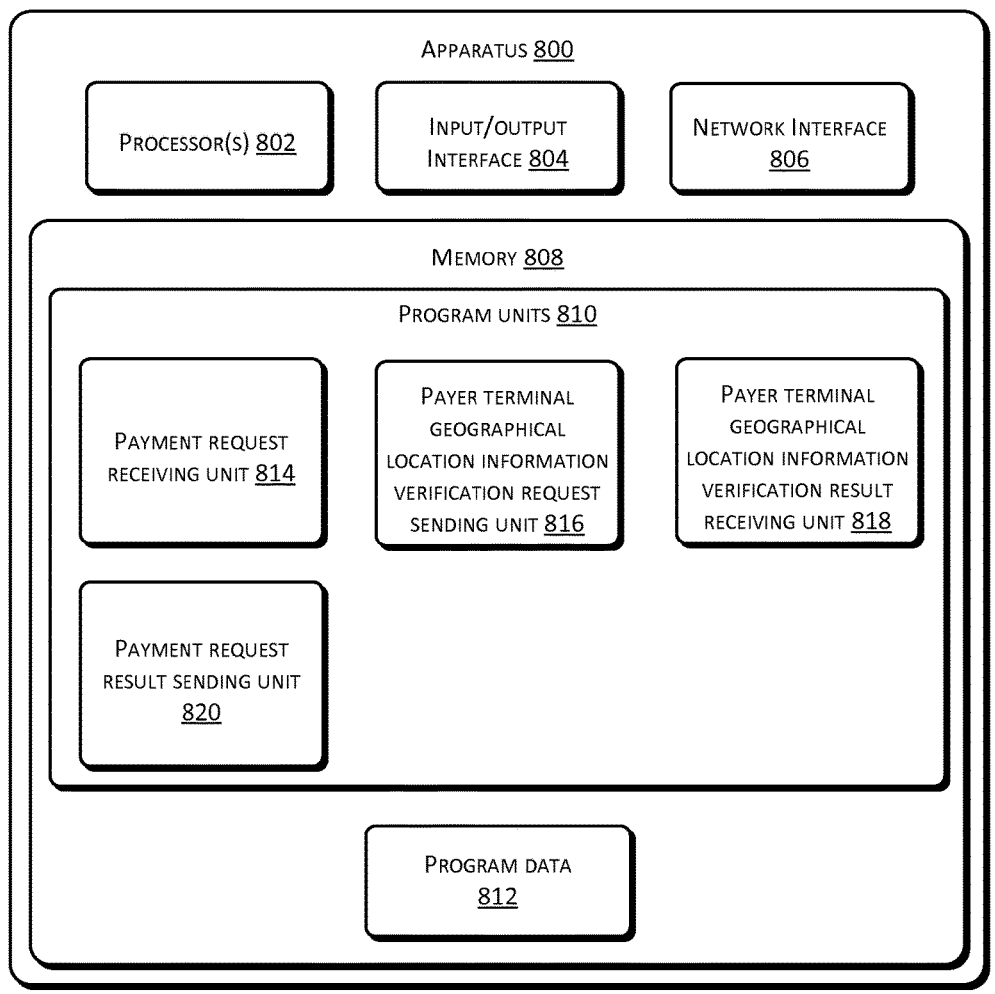
FIG. 8 is a schematic diagram of an example payment implementing apparatus according to the present disclosure.

The above embodiment provides a payment implementing method. Correspondingly, the present disclosure further provides a payment implementing apparatus 800 as shown in FIG. 8. Since the apparatus embodiment is substantially similar to the method embodiment, a description thereof is relatively simple, and a related portion can be found by referring to the description of the portion of the method embodiment. The apparatus embodiment described herein is used for illustrative purpose only.

In an implementation, the payment implementing apparatus 800 may include one or more processors 802, an input/output (I/O) interface 804, a network interface 806 and memory 808.

The memory 808 may include a form of computer readable media such as volatile memory, Random Access Memory (RAM), and/or non-volatile memory, e.g., Read-Only Memory (ROM) or flash RAM, etc. The memory 808 is an example of a computer readable media as described in the foregoing embodiments.

In an implementation, the memory 808 may include program units 810 and program data 812. The program units 810 may include a payment request receiving unit 814 to receive a payment request from a terminal of a payer to be verified; a payer terminal geographical location information verification request sending unit 816 to send a payer terminal geographical location information verification request to a server; a payer terminal geographical location information verification result receiving unit 818 to receive a verification result of the payer terminal geographical location information verification request from the server; and a payment request result sending unit 820 to send a payment result of the payment request to the terminal of the payer to be verified.

Figure 9:
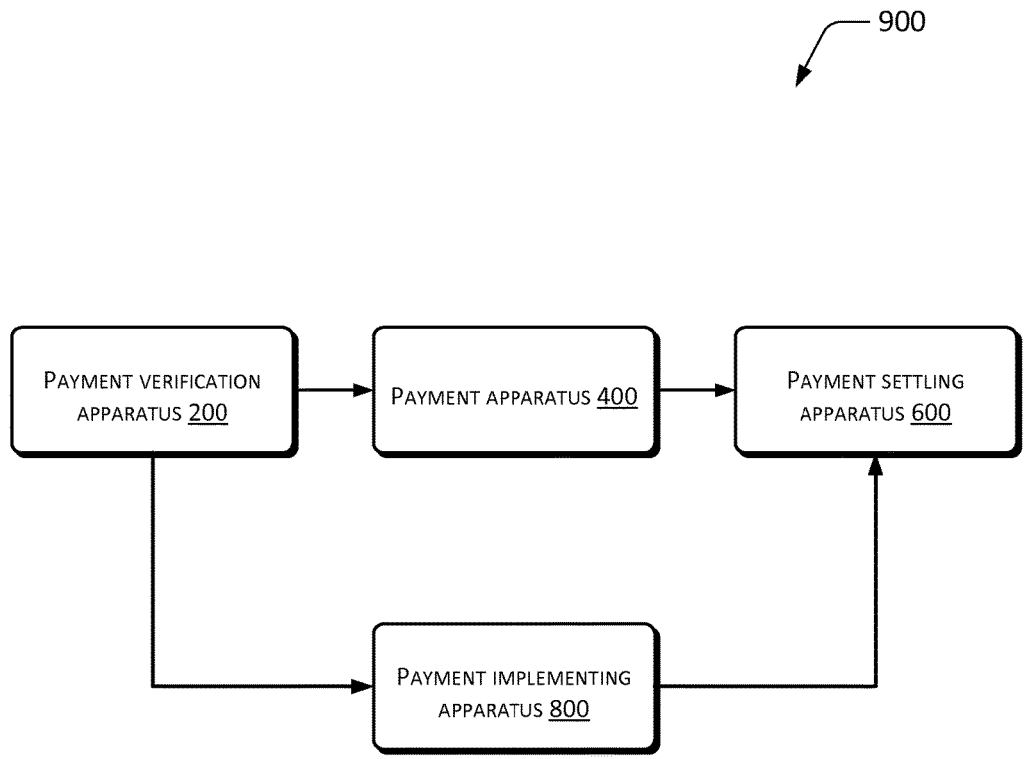
FIG. 9 is a schematic diagram of an example payment verification system according to the present disclosure.

FIG. 9 shows a schematic diagram of a payment verification system 900 according to the present disclosure. In an implementation, the payment verification system 900 may include the payment verification apparatus 200, the payment apparatus 400, the payment settling apparatus 600 and the payment implementing apparatus 800 as described in the foregoing description.

Exemplary embodiments of methods, apparatuses, and systems of payment verification that are provided by the present disclosure have been described in detail above. The present specification describes the principles and implementations of the present disclosure using specific examples. The foregoing description of the embodiments is used to help understanding the methods of the present disclosure and a core concept thereof. One of ordinary skill in the art can make changes to exemplary implementations and scopes of application based on the concept of the present disclosure. In short, the content of the present specification should not be construed as a limitation to the present disclosure.

In an implementation, the foregoing apparatuses and systems, such as the payment verification apparatus 200, the payment apparatus 400, the payment settling apparatus 600, the payment implementing apparatus 800 and the payment verification system 900, may each include one or more computing devices. In a typical configuration, a computing device may include one or more processors (CPUs), an input/output interface, a network interface and memory.

One skilled in the art should understand that the embodiments of the present disclosure may be embodied as a method, a system, or a computer program product. Accordingly, the present disclosure may take a form of an embodiment of hardware only, software only, or a combination of software and hardware. Furthermore, the present disclosure may take a form of a computer program product that is implemented in one or more computer-usable storage media (which includes, but is not limited to, a magnetic disk storage, CD-ROMs, an optical storage, etc.) which include computer-usable program code.

What is claimed is:

1. A method implemented by one or more computing devices, the method comprising:
receiving, from a receiver access point (AP), a verification request by a terminal of a payer to be verified to wirelessly connect to a wireless router of the receiver AP and geographical location information of the receiver AP, the verification request including account information of the payer to be verified;
verifying the account information of the payer to be verified according to the verification request to determine whether the account information of the payer to be verified matches with pre-stored payment account information registered by a user at a payment server;
returning a verification result of the verification request to the receiver AP, wherein a matching verification result causes the receiver AP to allow the terminal of the payer to wirelessly connect to the wireless router, and a non-matching verification result causes the receiver AP to prevent the terminal of the payer from wirelessly connecting to the wireless router;
receiving a payer terminal geographical location information verification request from the payment server in response to the verification result of the verification request indicating a match;
comparing the geographical location information of the receiver AP with pre-stored geographical location information of a registered receiver AP and determining a verification result of the payer terminal geographical location information verification request, wherein the verification result indicates that the terminal of the payer is located at an authorized payment site if the geographical location information of the receiver AP matches the pre-stored geographical location information, and otherwise indicates that the terminal of the payer is not located at the authorized payment site; and returning the verification result to the payment server.

2. The method of claim 1, further comprising:
receiving identification information of the terminal of the payer to be verified from the receiver AP;
receiving a payer terminal identity information verification request from the payment server in response to the verification result of the verification request indicating a match;
determining whether the identification information of the terminal of the payer to be verified matches with payer terminal identification information that has been bound with the pre-stored payment account information in advance; and
returning a verification result of the payer terminal identity information verification request to the payment server.

3. The method of claim 2, wherein, the identification information of the terminal of the payer to be verified includes one or more of a network adapter Media Access Control (MAC) address of the terminal of the payer to be verified, a Bluetooth MAC address of the terminal of the payer to be verified, and an International Mobile Equipment Identity (IMEI) number of the terminal of the payer to be verified.

4. The method of claim 1, wherein the account information of the payer to be verified may include a payment account to be verified and a password of the payment account to be verified.

5. The method of claim 1, wherein: prior to receiving the verification request for requesting to connect to the wireless router of the receiver AP from the terminal of the payer to be verified and the geographical location information of the receiver AP, the method further comprises:
receiving and storing respective payment account information and respective payer terminal identification information that is sent from one or more terminals of one or more payers; and
establishing respective one or more binding relationships between the respective payment account information and the respective payer terminal identification information.

6. The method of claim 5, wherein the respective payer terminal identification information comprises one or more of one or more respective network adapter Media Access Control (MAC) addresses of the one or more terminals of the one or more payers, one or more respective Bluetooth MAC addresses of the one or more terminals of the one or more payers, and one or more respective International Mobile Equipment Identity (IMEI) numbers of the one or more terminals of the one or more payers.

7. The method of claim 5, wherein the respective payment account information comprises a respective payment account and a password of the respective payment account.

8. The method of claim 1, wherein: prior to receiving the verification request for requesting to connect to the wireless router of the receiver AP from the terminal of the payer to be verified and the geographical location information of the receiver AP, the method further comprises receiving and storing respective geographical location information of one or more registered receiver APs.

9. The method of claim 1, further comprising:
receiving receiver AP identification information from the receiver AP;
determining whether the receiver AP identification information matches with pre-stored registered receiver AP identification information; and
sending a matching result of the receiver AP identification information to the payment server.

10. The method of claim 9, wherein: prior to receiving the verification request for requesting to connect to the wireless router of the receiver AP from the terminal of the payer to be verified and the geographical location information of the receiver AP, the method further comprises:
receiving and storing identification information of the registered receiver AP; and
establishing a corresponding relationship between the identification information of the registered receiver AP and pre-stored geographical location information of the registered receiver AP.

11. The method of claim 10, wherein the identification information of the registered receiver AP may include a Media Access Control (MAC) address of the registered receiver AP.

12. The method of claim 10, wherein: prior to receiving the verification request for requesting to connect to the wireless router of the receiver AP from the terminal of the payer to be verified and the geographical location information of the receiver AP, the method further comprises:

receiving and storing name information and other information of a receiving party to which the registered receiver AP belongs; and establishing a corresponding relationship between the identification information of the registered receiver AP and the name information and the other information of the receiving party to which the registered receiver AP belongs.

13. An apparatus comprising:

one or more processors;

memory;

a verification request receiving unit stored in the memory and executable by the one or more processors to receive, from a receiver access point (AP), a verification request by a terminal of a payer to be verified to wirelessly connect to a wireless router of the receiver AP and geographical location information of the receiver AP, the verification request including account information of the payer to be verified;

a verification request verifying unit stored in the memory and executable by the one or more processors to verify the account information of the payer to be verified according to the verification request to determine whether the account information of the payer to be verified matches with pre-stored payment account information registered by a user at a payment server;

a verification result sending unit stored in the memory and executable by the one or more processors to return a verification result of the verification request to the receiver AP, wherein a matching verification result causes the receiver AP to avow the terminal of the payer to wirelessly connect to the wireless router, and a non-matching verification result causes the receiver AP to prevent the terminal of the payer from wirelessly connecting to the wireless router;

a payer terminal geographical location information verification request receiving unit stored in the memory and executable by the one or more processors to receive a payer terminal geographical location information verification request from the payment server in response to the verification result of the verification request indicating a match;

a payer terminal geographical location information verifying unit stored in the memory and executable by the one or more processors compare the geographical location information of the receiver AP with pre-stored geographical location information of a registered receiver AP and determine a verification result of the payer terminal geographical location information verification request, wherein the verification result indicates that the terminal of the payer is located at an authorized payment site if the geographical location information of the receiver AP matches the pre-stored geographical location information, and otherwise indicates that the terminal of the payer is not located at the authorized payment site; and a payer terminal geographical location information verification result sending unit stored in the memory and executable by the one or more processors to return the verification result to the payment server.

14. The apparatus of claim 13, further comprising:

a to-be-verified payer terminal identification information receiving unit to receive identification information of the terminal of the payer to be verified from the receiver AP;

a payer terminal identity information verification request receiving unit to receive a payer terminal identity information verification request from the payment server in response to the verification result of the verification request indicating a match;

a payer terminal identity information verification request verifying unit to determine whether the identification information of the terminal of the payer to be verified matches with payer terminal identification information that has been bound with the pre-stored payment account information in advance; and a payer terminal identity information verification result sending unit to return a verification result of the payer terminal identity information verification request to the payment server.

15. The apparatus of claim 13, further comprising:

a payer terminal information pre-storage unit to receive and store respective payment account information and respective payer terminal identification information that is sent from one or more terminals of one or more payers; and a payer terminal information binding unit to establish respective one or more binding relationships between the respective payment account information and the respective payer terminal identification information.

16. The apparatus of claim 13, further comprising a geographical location information pre-storage unit to receive and store the geographical location information of the registered receiver AP.

17. The apparatus of claim 13, further comprising:

a receiver AP identification information receiving unit to receive receiver AP identification information from the receiver AP;

a receiver AP identification information verifying unit to determine whether the receiver AP identification information matches with pre-stored registered receiver AP identification information; and a receiver AP identification information verification result sending unit to send a matching result of the receiver AP identification information to the payment server.

18. The apparatus of claim 13, further comprising:

a registered receiver AP identification information pre-storage unit to receive and store identification information of the registered receiver AP; and a registered receiver AP identification information matching unit to establish a corresponding relationship between the identification information of the registered receiver AP and pre-stored geographical location information of the registered receiver AP.

19. The apparatus of claim 13, further comprising:

a registered receiver AP relevant information receiving unit to receive and store name information and other information of a receiving party to which the registered receiver AP belongs; and a registered receiver AP relevant information matching unit to establish a corresponding relationship between identification information of the registered receiver AP and the name information and the other information of the receiving party to which the registered receiver AP belongs.

20. One or more non-transitory computer-readable media storing executable instructions that, when executed by one or more processors, cause the one or more processors to perform acts comprising:
- sending a verification request to a receiver access point (AP) for requesting to wirelessly connect to a wireless router of the receiver AP, the verification request including account information of a payer to be verified;
- receiving a verification result of the verification request that is sent by the receiver AP based on whether the account information of the payer to be verified matches with pre-stored payment account information registered by a user at a payment server, wherein a matching verification result causes the receiver AP to allow a wireless connection to the wireless router, and a non-matching verification result causes the receiver AP to prevent a wirelessly connection to the wireless router;
- sending a payment request to a payment server through a network by the allowed wireless connection in response to the verification result of the verification request causing the receiver AP to allow the wireless connection; and
- receiving a payment result of the payment request from the payment server, the payment result indicating successful payment upon a determination that the payer is located at an authorized payment site based on geographical location information of the receiver AP matching pre-stored geographical location information of a registered receiver AP, and otherwise indicating payment failure upon a determination that the payer is not located at the authorized payment site.

* * * * *